(12) United States Patent
Rupp et al.

(10) Patent No.: US 9,103,280 B2
(45) Date of Patent: Aug. 11, 2015

(54) AIRCRAFT AIRFLOW MODULATION SYSTEM AND METHOD

(71) Applicant: Northrop Grumman Systems Corporation, Falls Church, VA (US)

(72) Inventors: George D. Rupp, Lakewood, CA (US); Trajaen J. Troia, Hermosa Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 190 days.

(21) Appl. No.: 13/781,584

(22) Filed: Feb. 28, 2013

(65) Prior Publication Data

US 2013/0177392 A1  Jul. 11, 2013

Related U.S. Application Data

(62) Division of application No. 12/539,451, filed on Aug. 11, 2009, now Pat. No. 8,429,893.

(51) Int. Cl.

| | |
|---|---|
| *F02C 7/04* | (2006.01) |
| *F02C 7/042* | (2006.01) |
| *F02K 7/20* | (2006.01) |
| *F02K 7/075* | (2006.01) |
| *F02K 7/16* | (2006.01) |
| *F02K 3/02* | (2006.01) |

(52) U.S. Cl.
CPC ................ *F02C 7/042* (2013.01); *F02K 7/075* (2013.01); *F02K 7/16* (2013.01); *F02K 7/20* (2013.01); *F02K 3/02* (2013.01); *Y02T 50/672* (2013.01)

(58) Field of Classification Search
CPC ............. F04D 3/00; F02C 7/042; F02K 3/02; F02K 7/16; F02K 7/075

USPC ............ 60/225, 224, 244–249, 767, 768, 204
See application file for complete search history.

(56) References Cited

U.S. PATENT DOCUMENTS

| | | |
|---|---|---|
| 2,955,414 A | 10/1960 | Hausmann |
| 3,016,694 A | 1/1962 | Howarth et al. |
| 3,199,810 A | 8/1965 | Stroud et al. |
| 4,307,743 A | 12/1981 | Dunn |
| 5,148,673 A | 9/1992 | Enderle |
| 5,343,695 A | 9/1994 | Pascal et al. |

(Continued)

*Primary Examiner* — Ted Kim
(74) *Attorney, Agent, or Firm* — Stetina Brunda Garred & Brucker

(57) ABSTRACT

The present invention relates to a mechanical system and method that modulates airflow in an aircraft inlet diffuser that is used in conjunction with an aircraft engine that integrates both a center turbine engine and a high Mach engine such as a constant volume combustor (CVC) arrangement or ramjet arrangement with intakes formed co-centrically about the turbine. The modulation system uses two articulating components, a movable air flow duct and an articulating cone. The air flow duct, in a first position, is in exclusive air flow communication with the circular intake face of the turbine in a first position to receive air from the intake diffuser. In this configuration the expandable cone is in a retracted position and does not redirect airflow and allows the aircraft to operates in low speed mode as only the turbo jet receives airflow. In a transition speed mode, the air flow duct is retracted to allow air flow to both the turbo jet and the CVC. At its widest expanse, the articulating cone completely covers the turbo jet circular intake face directing air solely to the high Mach aircraft engine to allow the aircraft to operate in high speed mode.

9 Claims, 3 Drawing Sheets

(56) References Cited

U.S. PATENT DOCUMENTS

| | | | |
|---|---|---|---|
| 7,051,659 B2 * | 5/2006 | Tyll et al. ............... 102/374 |
| 7,168,236 B2 | 1/2007 | Schmotolocha et al. |
| 8,429,893 B2 | 4/2013 | Rupp et al. |
| 2005/0183413 A1 | 8/2005 | Kojima et al. |

* cited by examiner

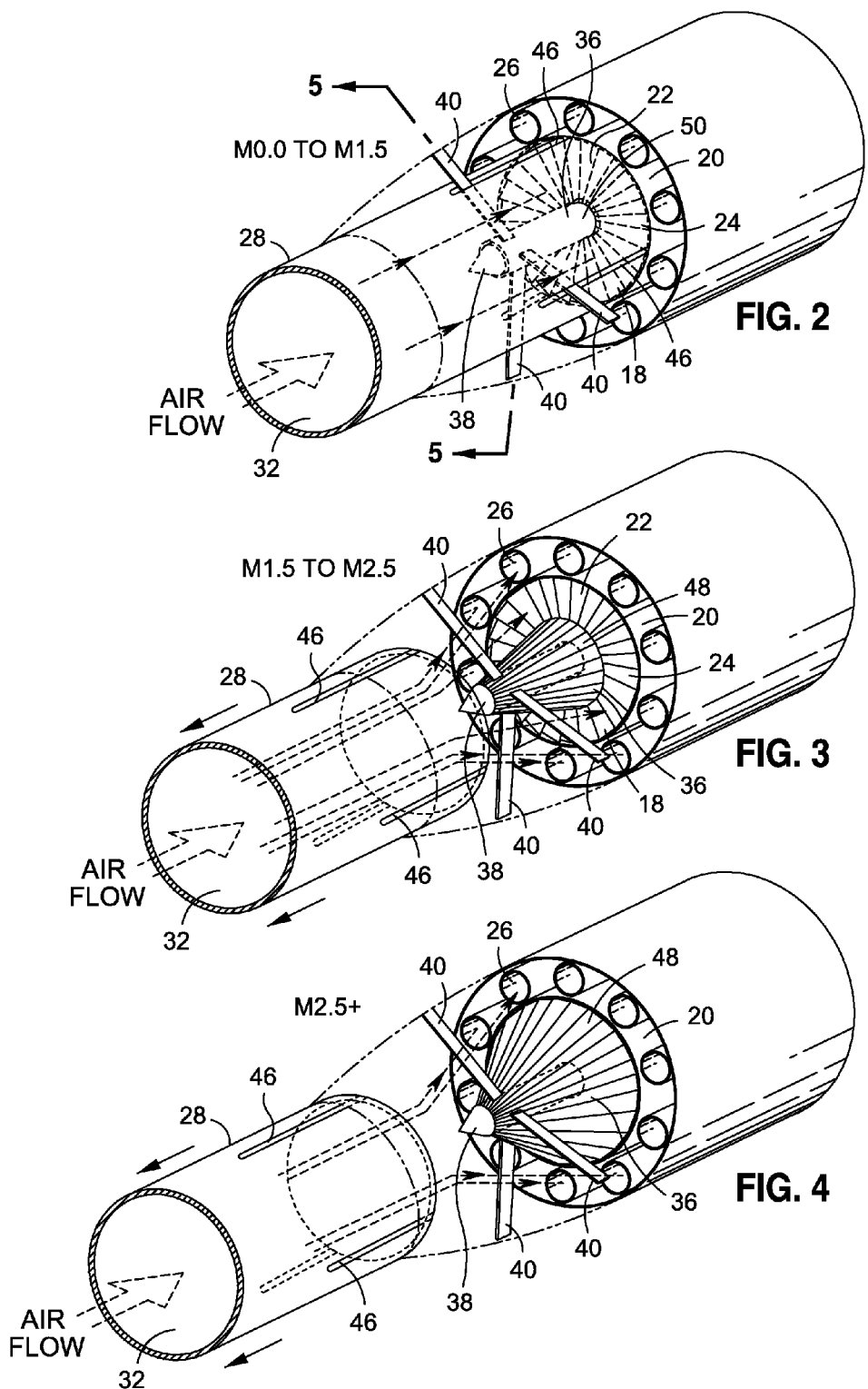

AIRCRAFT AIRFLOW MODULATION SYSTEM AND METHOD

CROSS-REFERENCE TO RELATED APPLICATIONS

The present application is a divisional patent application of U.S. patent aPplication Ser. No. 12/539,451 for Airflow Modulation for Dual Mode Combined Cycle Propulsion Systems, filed on Aug. 11, 2009, now U.S. Pat. No. 8,429,893, and incorporates by reference the substance thereof.

STATEMENT RE: FEDERALLY SPONSORED RESEARCH/DEVELOPMENT

Not Applicable

BACKGROUND

The present invention relates generally to airflow intake modulation associated with aircraft engines. More particularly, the present invention relates to a mechanical system and method that modulates airflow in an aircraft inlet diffuser that is used in conjunction with an aircraft engine that integrates both a center turbine engine and a constant volume combustor ("CVC") or ramjet arrangement with intakes formed co-centrically about the turbine. The airflow modulation directs airflow to each engine system separately and to both in combination to allow the aircraft to operate in multiple modes at different airspeeds.

The aircraft industry has desired the development of hypersonic aircraft that can takeoff and land at conventional airfields. To facilitate the design of such an aircraft, duel or integrated aircraft engines have been incorporated into the aircraft that utilize turbo jet propulsion during takeoff and landing and at air speeds of zero to Mach 2-3. Above Mach 2-3, a CVC such as a continuous detonation engine ("CDE") or a pulse detonation engine ("PDE") is used to maintain hypersonic speed. Likewise a ramjet type engine may be used at the higher speeds. As such, at the upper limit speed of the turbo jet, such an aircraft is designed to transition to CVC or ramjet propulsion to maintain hypersonic air speeds, and then to transition back to the turbo jet engine, when the speed goes below Mach 2-3. The use of multiple engine types on a single aircraft creates many design difficulties for the aircraft. Prior designs required separate flow paths leading to each engine to facilitate operation of the engines and has resulted in unwanted increased weight, complexity and cost.

Further, attempts to integrate different types of engines into a single structure to produce hybrid engines may result in the reduced efficiency and speed. For example, in the SR-71 Blackbird J58 engine, Pratt & Whitney, West Palm Beach, Fla. variable geometry was used to bypass flow after the fourth stage of the compressor to outer combustors that operated similar to a ramjet. Because the modified ramjet was integrated within the structure turbojet, the J58 engine could only achieve a top speed of approximately Mach 3, well below the capacity of a conventional ramjet.

In order to address some of the design difficulties associated with hybrid engines and multiple engine systems, prior designs integrated a turbo jet engine or CVC engine(s) into the aircraft structure to share a common airstream. The airflow management of the airstream in such designs is critical to the efficient and stable operation of the integrated engines. In an example of a previous airflow management system, a moveable member within the airstream inlet acts as a simple airflow shutoff for either directing airflow into the turbine or directing airflow into the CVC engines. While previous airflow management systems allow for immediate transitioning between integrated engines, such prior designs do not provide for airflow management that includes articulation to provide modified airflow during transition speeds, or to allow both engines to operate simultaneously in a designed duel engine mode.

As such, there is a great need in the art for an aircraft engine airflow management system that provides a smooth transition between operation of the turbo jet engine to a hypersonic engine by allowing both integrated engines to operate simultaneously in an intermediate speed mode.

BRIEF SUMMARY

The present invention relates to a mechanical system and method that modulates airflow in an aircraft inlet diffuser that is used in conjunction with an aircraft engine that integrates both a center turbine engine and a constant volume combustor (CVC) or ramjet arrangement with intakes formed co-centrically about the turbine. The modulation system uses two articulating components, a movable air flow duct and an articulating cone. The air flow duct, in a first position is in exclusive air flow communication with the circular intake face of the turbine in a first position to receive air from the intake diffuser. It this configuration the expandable cone is collapsed and does not redirect airflow. In low speed mode, as only the turbo jet receives airflow. In a transition speed mode, the air flow duct is retracted to allow air flow to both the turbo jet and the CVC or ramjet engines. The expandable cone articulates to radially cover the circular face the turbo jet. At its widest expanse the articulating cone completely covers the turbo jet face, and allowing air solely to the CVC or ramjet aircraft engine to allow the aircraft to operate in high speed mode. Likewise, the airflow modulator of the present invention can transition from high speed mode to low speed mode by collapsing the cone to achieve an intermediate mode allowing both the CVC and turbojet to operate, and then to low speed mode by moving the air duct from the retracted position to the first position to direct airflow exclusively to the turbine.

The integrated turbine and constant volume combustor aircraft engines with air flow modulation system includes a turbine, at least partially positioned in a cylindrical housing. The turbine has an exposed generally circular intake face with compressor blades and a center bearing shaft. A series of constant volume combustor engine intakes or ramjet intakes are positioned circumferentially about the generally cylindrical housing enclosing the turbine.

The system includes a generally cylindrical air flow duct movable between a first position that directs airflow from an air intake of the aircraft exclusively to the intake face of the turbine. The second position of said air flow duct directs airflow to both the circular intake face of the turbine and to the constant volume combustor engine intakes. It is contemplated that the constant volume combustor engines in air flow communication with the constant volume combustor engines are continuous pulse engines or pulse detonation engines (PDEs). Alternatively, the co-annular engine intakes can be in fluid communication with ramjet engines.

The system also includes an air deflector positioned upstream of a the generally circular turbine face of a turbine engine wherein the air deflector has a first retracted configuration forming a cylindrical body in axial alignment with a center shaft of the turbine, allowing full airflow to said turbine; and wherein said air deflector has a second deployed configuration forming a cone shaped body, the apex of said cone shaped body positioned upstream of the turbine, and the base of the cone shaped body covering at least a portion of the turbine face of the turbine engine. The area between said apex and said base forming an air deflecting surface; wherein said deflector in said second deployed configuration, provides an air deflecting surface, deflecting airflow away from the turbine face covered by the cone shaped body base. The air deflecting surface may be formed of a series of overlapping slats, or alternatively from a pliable sheet material such as a high temperature polymer.

The method of propelling an aircraft using integrated turbine and high Mach aircraft engines with air flow modulation of the present invention comprises the steps of: directing inlet airflow primarily to the inlet of a turbojet aircraft engine to generate a thrust on the aircraft in a first propulsion mode; directing inlet airflow to the inlet of the turbojet aircraft engine and the intake of a high Mach aircraft engine, such as a CDE, PDE or scramjet engine to generate a thrust on the aircraft in a second propulsion mode; and directing inlet airflow primarily to the intake of the constant volume combustor aircraft engine to generate thrust on the aircraft in a third propulsion mode. The first propulsion mode operates the aircraft at airspeeds from zero to Mach 1.5; the second propulsion mode at airspeeds from Mach 1.5 to Mach 2.5; and the third propulsion mode at airspeeds above Mach 2.5.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2 is a perspective view of the air flow management system of the present invention showing operation at low speed with use of a turbo jet only;

FIG. 3 is a perspective view of the air flow management system of the present invention showing operation at intermediate speed with use of a combination the turbo jet and CVC or ramjet propulsion;

FIG. 4 is a perspective view of the air flow management system of the present invention showing operation at high speed with use of CVC or ramjet propulsion only;

DETAILED DESCRIPTION

Figure 1:
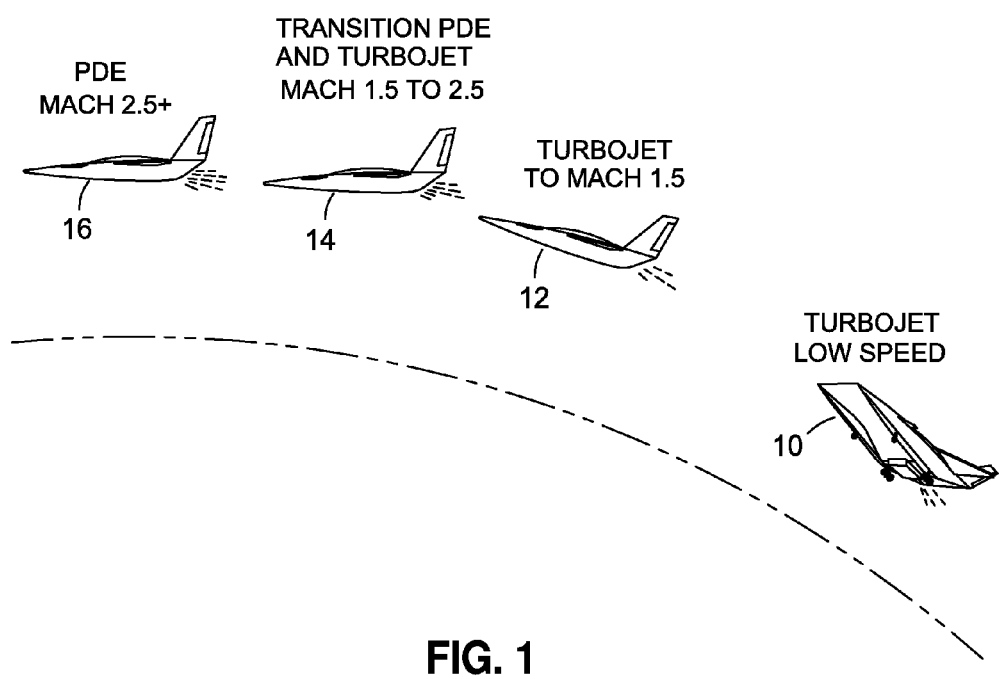
FIG. 1 is a chart showing types of engines used on aircraft at low speed and hypersonic speeds.

Referring to FIG. 1, there is shown the various modes for which the modulation system of the present invention operates. Because the present invention employs both a turbo jet engine and a high Mach engine such as CVC or ramjet, it allows the aircraft to operate at a wide range of air speeds. For purposes of this application, use of the term high Mach engine may include ramjet engines or CVC engines, such as CDE or PDE engines. In the present invention, the aircraft may utilize both the turbo jet engine and the high Mach engine simultaneously at intermediate speeds. For example as shown in FIG. 1 the turbo jet is utilized in a low speed operation mode 10. In this regard, the turbo jet is used exclusively in takeoff and landing up to approximately Mach 1.5 as shown in 12. The air modulation system and method of the present invention allows the aircraft to operate in intermediate mode 14 by utilizing both the turbo jet engine as well as the high Machengine simultaneously in speed ranges between Mach 1.5 to Mach 2.5. Upon reaching Mach 2.5 the high Mach engine is exclusively employed in a third mode of operation 16 at high speed. In this regard, the high speed mode operates at speeds exceeding 2.5 Mach.

Figure 5:
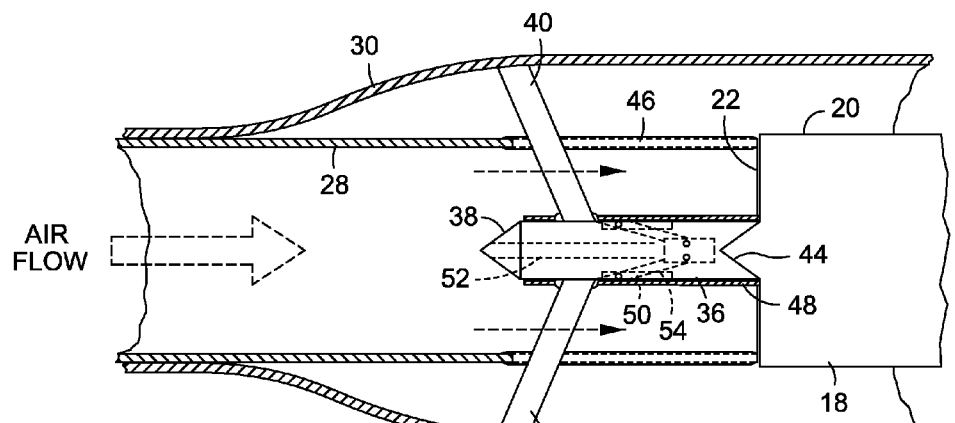
FIG. 5 is cross-sectional view of the air flow management system of the present invention showing operation at low speed with use of a turbo jet only as represented in FIG. 2.
Figure 6:
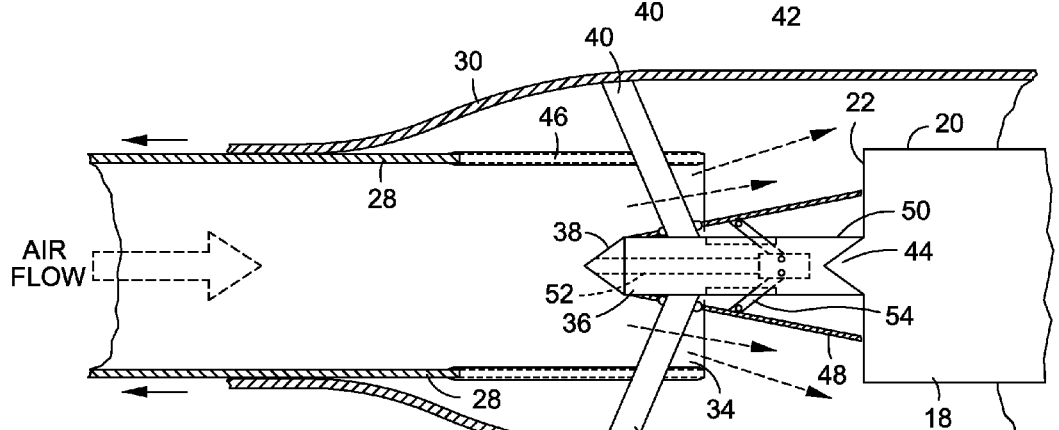
FIG. 6 is a cross-sectional view of the air flow management system of the present invention showing operation at an intermediate speed with a combination of engines as represented in FIG. 3.
Figure 7:
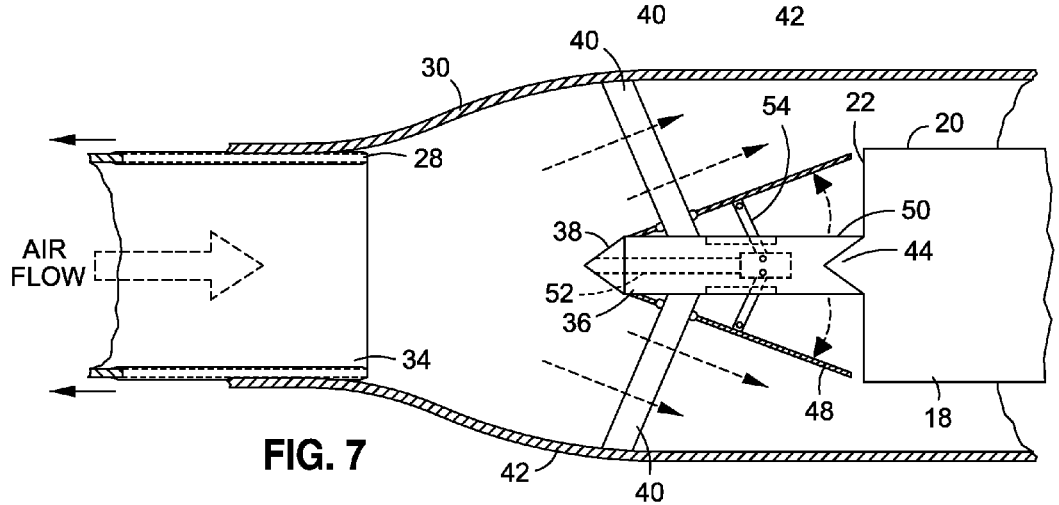
FIG. 7 is a cross-sectional view of the air flow management system of the present invention showing operation at high speed with use of CVC or ramjet propulsion only as represented in FIG. 4.

Referring particularly to FIGS. 2 though 7, the air modulation system and method of the present invention is described and shown in various modes of operation. Referring particularly to FIGS. 2 and 5 there is shown the structure of the system of the present invention in the low speed flight mode. FIGS. 3 and 6 show intermediate speed mode and FIGS. 4 and 7 show high speed mode.

The airflow system of the present invention is utilized in conjunction with an integrated aircraft engine which includes a turbine 18. The turbine is positioned within a cylindrical housing 20 and the turbine has a generally circular surface intake face 22. Although construction can vary in different types of turbine engines, the turbine shown in FIGS. 2 through 7 include compressor blades 24 that are positioned within circular intake face 22. The compressor blades 24 extend radially from a center bearing shaft (not shown). The invention may incorporate any conventional turbine engine. The airflow modulation system of the present invention allows for the stable transition from the turbine engine 18 propulsion to a high Mach engine propulsion through the airflow intakes 26.

A plurality of high Mach engine intakes 26 are positioned circumferentially about the turbine 18. The intakes 26 may be in airflow communication with various types of high Mach engines such as one or a series of CDE, PDE or scramjet engines. A PDE for example, is an intermittent constant-volume combustion engine consisting of a chamber that houses the mixing of fuel and oxidizer which is then ignited to produce a detonation wave through the detonation tube and exhaust to produce thrust on the engine and aircraft at high speeds. PDEs are described in detail at U.S. Pat. No. 6,857,261, the substance of which is incorporated herein by reference. The high Mach engine intakes 26 as shown have generally circular intake faces, however, the intakes may be formed in any useful configuration to allow operation of the high Mach engine. Also, the intakes 26 are shown as being generally flush or in the same plane as the circular intake face 22 of the turbine 18, however it is recognized that the high Mach engine intakes 26 may be positioned circumferentially about the turbine 18, forward of the intake face 22, or set back, behind the face 22.

Referring particularly to FIGS. 2 and 5 the airflow modulation system of the present invention is shown in low speed mode of operation. As shown in the low speed operation mode, an airflow duct 28 is positioned within the air intake of an engine bay 30. The air duct 28 is formed in a generally cylindrical shape having open ends 32 upstream from the airflow and an open end 34 downstream from the airflow. It is contemplated that the duct 28 is formed from laminate composite, however, any rigid material may be suitable. In the low speed mode of operation, air enters the opening 32 of the duct 28 and air is directed onto the turbine intake face 22. The outer perimeter of the opening 34 of the air duct 28 is complementary to the air intake face 22 of the turbine 18. As such, in the first closed position, in low speed operation mode, the airflow from the aircraft engine intake is directed exclusively to the turbine 18 through the turbine face 22 through the duct 28. In this low speed operation mode, air is excluded from the high Mach engine intake 26. The opening 34 of the duct 28 forms a closed fluid seal over the complimentary shape of the turbine face 22 by contacting the outer perimeter of the face 22 by means of a rubber seal (not shown) or other like means of preventing lateral airflow, such as a rubber seal or brush seal.

In the low speed operation mode as shown in FIGS. 2 and 5, the articulating airflow modulator cone 36 is in a retracted position forming a generally cylindrical shape and includes a top face cone 38. The modulator cone 36 is supported by a series of truss members 40 interconnected between the modular cone 36 and the engine bay wall 42. Support is required by the trusses 40 as the base of the articulating cone 36 is suspended in non-contact relation to the bearing shaft (not shown) which spins along with the turbine blades 24. The modulator cone 36 is therefore held in stationary relation to the spinning turbine blades 24 and centered upstream to the turbine intake face 22. The truss members are formed of high strength aluminum or composite, however, any suitable rigid material may be utilized. Also, the truss members 40 may be configured to have an aerodynamic or low profile cross section to minimize air flow disruption in the engine bay 30.

Referring particularly to FIGS. 3 and 6 there is shown the intermediate mode of operation where the air duct 28 moves upstream to the air flow, providing an opening between the perimeter of the open end 34 of the duct 28, thereby allowing air to pass into both the face of the turbine 22 as well as the high Mach engine intakes 26. Slots 46 are formed in the air duct 28 to allow movement of the air duct 28 around the support trusses 40. Slots may include deformable rubber or brush seals (not shown) to minimize airflow through the slots 46. Additionally, the support trusses may include metallic plates (not shown) that are contoured to the shape of the duct slots. These plate edges would sit inside grooves within the duct slots, allowing the duct to fluidly translate past the support trusses. The air duct 28 may be movable by hydraulic systems (not shown) or other mechanical interface that may be electronically controlled on board the aircraft. In the intermediate mode of operation, the air duct 28 exposes both the turbine face 22 and the high Mach engine intakes 26 to air flow. The articulating cone 36 may be in the fully retracted position as shown in FIGS. 2 and 5 allowing full air passage to the turbine 18 or blockage of the intake face 22 of the turbine 18 through the expansion of the cone 36 as shown in FIGS. 3 and 6.

The articulating cone 36 of the present invention comprises a plurality of extendable members 48 which are driven to expand circumferentially over the turbine face 22. The upstream end of the members 48 are pivotally attached to a base center shaft 50. The members 48 are preferably formed of a series of overlapping rigid slats formed of aluminum or composite material. Also, the members 48 may underlie a semi-rigid sheet of material that opens in an umbrella like fashion, such as a specialty polymer having sufficient rigidity to deflect air flow, but being pliable enough to be retracted and expanded, as well as being heat resistant up to temperatures of approximately 1200 degrees Fahrenheit. An inner shaft 52 positioned within the center shaft 50 is connected at the upstream end to the face cone 38. The inner shaft 52 is moveable from a first retracted position as shown in FIG. 5 to an expanded position as shown in FIGS. 6 and 7 as it moves upstream within the center. The inner shaft 52 may be movable by hydraulic systems (not shown) or other mechanical interface that may be electronically controlled on board the aircraft. Movement upstream of the inner shaft 52 within the shaft 36 causes a plurality of pivot arms 54 extends radially from the inner shaft 52 and are pivotally connected at a first end, to the inner shaft and second end, to the members 48. As such, as the inner shaft moves upstream, the pivotally attached pivot arms 54 force the members 48 outwardly to deflect airflow to, at first, a portion of the turbine face 22 during intermediate operations, to a position that fully deflects the airflow from the turbine face 22 as shown in FIGS. 4 and 7. FIGS. 4 and 7 represent air modulation system in the high speed operation mode. As such, air is deflected by the members 48 of the articulating cone 36 away from the turbine 18 and directly and exclusively into the high Mach engine intakes 26. The ends of members 48 may include rubber or brush seals (not shown) to prevent lateral airflow.

The above description is given by way of example, and not limitation. Given the above disclosure, one skilled in the art could devise variations that are within the scope and spirit of the invention disclosed herein, including various ways of constructing the air flow modulator. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of propelling an aircraft having an integrated turbine and a plurality of high Mach aircraft engines disposed about the integrated turbine, the integrated turbine defining a center shaft and a generally circular turbine intake face, the method comprising:
    positioning a translatable cylindrical air duct upstream of the turbine and high Mach aircraft engines, the cylindrical air duct being axially translatable with respect to the center shaft and positioned upstream of the turbine intake face; and
    axially translating the cylindrical air duct from a first position wherein the aft end of the cylindrical duct is positioned forward of the plurality of high Mach engines, such that airflow through the cylindrical air duct is communicated to both the turbine and the plurality of high Mach aircraft engines to generate a thrust on the aircraft in a first propulsion mode, to a second position wherein the aft end of the cylindrical air duct substantially abuts the outer circumference of the turbine intake face such that air flow through the cylindrical air duct is communicated only to the turbine to generate a thrust on the aircraft in a second propulsion mode.

2. The method of propelling an aircraft as set forth in claim 1 further comprising:
    translating the cylindrical air duct to the first position to allow air flow through the cylindrical air duct to be communicated to the turbine and the high Mach aircraft engines; and
    translating a plurality of extendable members of an articulating cone disposed upstream of the turbine face to expand radially over the turbine intake face to preclude airflow to the turbine, such as the aircraft is propelled in a third propulsion mode wherein the aircraft is powered solely by the plurality of high Mach aircraft engines.

3. The method of claim 2 wherein the first propulsion mode operates the aircraft at airspeeds from zero to Mach 1.5; the second propulsion mode at airspeeds from Mach 1.5 to Mach 2.5; and the third propulsion mode at airspeeds above Mach 2.5.

4. The method of claim 2 further comprising axially extending the articulating cone from a first retracted position spaced from the turbine face to a second extended position wherein the articulating cone substantially abutting the turbine face; and wherein when the articulating cone is in the second extended position, the articulating cone blocks at least an area of the turbine intake face from airflow communication.

5. The method of claim 4 wherein the cylindrical air duct axially translates independent of translation of the articulating cone.

6. The method of claim 1 further comprising centering a forward end of the articulating cone in stationary relation to the turbine intake face, upstream to the turbine intake face.

7. The method of claim 6 wherein the articulating cone is supported by a plurality of truss members interconnected between the articulating cone and an engine bay wall.

8. The method of claim 1 wherein the articulating cone translates independent of translation of the cylindrical air duct.

9. The method of claim 1 wherein the cylindrical air duct defines a diameter that is substantially equal to the diameter of the turbine intake face and less than a diameter defined by the plurality of high Mach aircraft engines.

* * * * *